United States Patent [19]

Kitahara

[11] Patent Number: 4,690,828

[45] Date of Patent: Sep. 1, 1987

[54] COAGULATED FOOD MADE FROM BROWN ALGAE

[76] Inventor: Nagako Kitahara, Shimonoseki, Japan

[21] Appl. No.: 815,707

[22] PCT Filed: Apr. 11, 1985

[86] PCT No.: PCT/JP85/00186

§ 371 Date: Dec. 11, 1985

§ 102(e) Date: Dec. 11, 1985

[30] Foreign Application Priority Data

Apr. 11, 1984 [JP] Japan .................................. 59-73796

[51] Int. Cl.⁴ .............................................. A23L 1/04
[52] U.S. Cl. .................................... 426/575; 426/615; 426/573
[58] Field of Search ......................... 426/575, 573, 615

[56] References Cited

FOREIGN PATENT DOCUMENTS

| 0090719 | 10/1983 | European Pat. Off. | 426/575 |
| 0040051 | 3/1983 | Japan | 426/575 |
| 0040077 | 3/1983 | Japan | 426/575 |
| 0075261 | 4/1985 | Japan | 426/575 |
| 0217882 | 10/1985 | Japan | 426/575 |

*Primary Examiner*—Jeanette Hunter
*Attorney, Agent, or Firm*—Armstrong, Nikaido, Marmelstein & Kubovcik

[57] ABSTRACT

A coagulated food made from brown algae of at least two kinds of brown algae A and B, which is prepared by dissolving the brown alga A to form a viscous liquid which is interspersed with fibrous or solid portions of an undissolved matter, mixing said viscous liquid with finely divided particles of the brown alga B, coagulating and leaching with water the obtained mixture.

3 Claims, No Drawings

COAGULATED FOOD MADE FROM BROWN ALGAE

TECHNICAL FIELD

The present invention relates to a coagulated food made from seaweeds, particularly from brown algae

BACKGROUND

The following two coagulated food products made from brown algae have been known heretofore:

(1) a coagulated food product prepared by dissolving finely divided wakame or other brown algae in sodium citrate etc., removing (by filtration) an undissolved matter to obtain a viscous liquid, seasoning and coagulating said viscous liquid with calcium chloride etc. (see Japanese Patent Laid-Open No. 109975 8/1978), and (2) a coagulated food product prepared by entirely liquefying with sodium citrate etc. each of the two kinds of brown algae, i.e. makombu (*Laminaria japonica*) and wakame, or makombu and hondawara (*Sargassum fulvellum*), into a solution or a viscous liquid, mixing the obtained solutions or viscous liquids, coagulating the mixture with calcium chloride etc. (see Japanese Patent Laid Open No. 99179 / 1982)

These products have been developed to overcome difficulties encountered in the processing of brown alga algae, which is attributable to a strongly bonded structure formed between cellulose and hemicellulose, the cell-forming substances of brown algae. The application of brown algae as processed food has been limited due to these difficulties, though brown algae are relished as tasty and healthy food because of its intrinsic perfume, large amounts of relishable ingredients, and minerals contained therein.

Under these circumtances, the coagulated food products made from brown algae by the methods described above are excellent examples of the broadened application of brown algae which have been conventionally applied only as tsukudani or cooked seaweed, by seasoning or other treatments.

However, disadvantages of these coagulated food products are loss of the intrinsic perfume of brown algae and deterioration in flavor and relish, due to the escape of the relishable ingredients and extracts of brown algae when it is leached with water after coagulation, because most part of the starting brown algae material is preliminarily liquefied into a solution or a viscous liquid.

Accordingly, an object of the present invention is to overcome these disadvantages of the conventional coagulated food products made from brown algae, and to provide a coagulated food product in which the intrinsic flavor and relish of brown algae are retained.

DISCLOSURE OF THE INVENTION

The present invention provides a coagulated food product made from brown algae, comprising of at least two kinds of brown algae A and B, which is prepared by dissolving the brown alga A to form a viscous liquid which is interspersed with fibrous or solid portions of an undissolved matter, mixing said viscous liquid with finely divided particles of the brown alga B, coagulating and leaching with water the obtained mixture.

The present invention can provide a coagulated food product in which the flavor and relish inherent to brown algae is more excellently retained even after the leaching with water than in the conventional food products made from them.

BEST MODE OF CARRYING OUT THE INVENTION

The constitution of the present invention will now be described in more detail.

At least two kinds of brown algae A and B are used for the preparation of the coagulated food product made from brown algae of the present invention. It was found that kombu and wakame are most preferable as said brown algae, as the result of the organoleptic test. However, arame (*Eisenia bicyclis*), kajime (*Ecklonia cava*), hijiki (*Hizikia fusiforme*), hondawara, and other brown algae, or a combination of these brown algae and kombu or wakame can be used.

The weight ratio of the kombu to the wakame is preferably within the range of 3:1 to 1:2. When the proportion of the kombu or the wakame is outside this range, unappetizing muddiness may be observed in the color of the resulting food product, and the integrity of the product may be deteriorated. However, the weight ratio is not necessarily limited to that range.

Kombu is usually employed as the brown alga A. Sodium citrate, sodium phosphate, or other conventional substances known as a chelating agent is used to dissolve it. When using dried material, the brown alga A is preliminarily washed with water to remove sand or other impurities, immersed in and swollen with water so that the material becomes hydrophilic and is easily dissolved with said chelating agent.

The brown alga A, dissolved with said chelating agent, is used in the form of a viscous liquid interspersed with fibrous or solid portions of an undissolved matter. The loss by exudation of the intrinsic flavor and relish of brown algae is reduced by the undissolved matter remaining in the liquid. The size of said undissolved matter is preferred to be within the range of 0.5 to 2 mm in length. If it is shorter than that, it cannot be distinguished from the dissolved matter (the liquid part of the viscous liquid), and the intrinsic flavor and relish may be lost upon leaching with water. On the other hand, if the undissolved matter is longer than that, the touch of the food product to the tongue is not good when it is eaten. However, the size of the undissolved matter may not be necessarily limited to that range.

Wakame is usually employed as the brown alga B, in the form of finely divided particles. The size of the particles is preferred to be about the same as that of the undissolved matter of the brown alga A, for the same reasons as above.

The viscous liquid made from the brown aga A is mixed with the finely divided particles of the brown alga B, and the mixture is coagulated and leached with water, forming a coagulated food product made from brown algae. The brown algae A and B are mixed by stirring or other means so that the portions of the undissolved matter remaining in the viscous liquid and the finely divided particles are homogeneously dispersed in the liquid. The unevenness in the flavor or relish is prevented by the homogeneous dispersion of them.

The mixture is coagulated by immersing it in calcium chloride etc. The product is formed into thin strings, plates, or spheres in the coagulating step. The object of the leaching of the product with water is removal of chemicals used for its treatment.

EXAMPLE 1

1 kg of raw kombu and 1 kg of raw wakame were well washed with water to remove sand and other impurities. The kombu was immersed in 500 ml of a 20% soda ash solution and stirred at 40° to 50° C. be dissolved in such a manner that the solution was interspersed with fibrous or solid portions of the undissolved matter. 24 l of water was then added to the solution.

1 kg of wakame, which had been finely divided into particles of the same size as that of said undissolved portions of the kombu, was mixed with the kombu. The mixture was jet-molded in a solution obtained by dissolving 1.5 kg of calcium chloride and 1 l of malic acid in 24 l of water. 22 kg of a coagulated food product was obtained after being leached with water for 24 bours.

The results of the organoleptic test of this product showed that the product was more excellent in flavor, relish, and touch to the tongue than the coagulated food products prepared by the prior art. The organoleptic test of the product which had been sealed and stored for 3 months gave the same results.

EXAMPLE 2

1.5 kg of kombu and 0.5 kg of wakame were treated in the same manner as described in Example 1 to obtain a coagulated food product, which was a little paler in color, but as excellent in flavor, relish, and touch to the tongue as the one obtained in Example 1 except that the taste of kombu was a little stronger.

EXAMPLE 3

0.7 kg of kombu and 1.3 kg of wakame were treated in the same manner as described in Example 1 to obtain a coagulated food product, which was excellent in color but a little inferior in integrity. However, it was found as the result of the organoleptic test that the product was as excellent as the one obtained in Example 1 in flavor, relish, and touch to the tongue.

EXAMPLE 4

A coagulated food product was obtained in the same manner as described in Example 1, except that 0.5 kg of the kombu was decomposed with cellulase. It was found as the result of the organoleptic test that the product was more relishable than the one obtain in Example 1.

Moreover, three or more kinds of brown algae, a combination of twe or more kinds of brown algae and other seaweeds or food products of the earth and the sea can be used in Example 1, 2 or 3.

INDUSTRIALLY APPLICABLE

The present invention, which comprises a combination of a viscous liquid in which a brown alga is dissolved into a solution interspersed with fibrous or solid portions of an undissolved matter and finely divided particles of another brown alga, can afford a coagulated food product rich in the intrinsic flavor and relish of brown algae, because the loss by exudation of the flavor and relish, which may be caused by the leaching of the product with water for the removal of various chemicals used for its treatment, is controlled.

I claim:

1. A coagulated food product made from brown algae comprising:
    at least two different kinds of brown algae, the food product is prepared by dissolving a first kind of brown algae in a chelating agent to form a viscous liquid which is interspersed with fibrous, solid portions of the brown algae which are undissolved,
    mixing the viscous liquid and interspersed fibrous, solid portions of undissolved brown algae with finely divided particles of a second brown algae,
    coagulating the mixture by immersion into a chemical which will cause coagulation,
    and leaching the coagulated mixture with water.
2. A coagulated food product made from brown algae as set forth in claim 1 wherein said first brown algae is kombu (Laminaria) and said second brown algae is wakame (Undaria), and the weight ration of the former to the latter is within the range of 3:1 to 1:2.
3. A coagulated food made from brown algae as set forth in claim 1 wherein the size of the portions of said undissolved first brown algae is within range of 0.5 to 2 mm in length.

* * * * *